(12) United States Patent
Okumura et al.

(10) Patent No.: US 10,232,810 B2
(45) Date of Patent: Mar. 19, 2019

(54) ELECTRICAL CONNECTION BOX

(71) Applicant: Sumitomo Wiring Systems, Ltd., Yokkaichi, Mie (JP)

(72) Inventors: Masakazu Okumura, Mie (JP); Shunsuke Mizukami, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/579,630

(22) PCT Filed: Jun. 13, 2016

(86) PCT No.: PCT/JP2016/067576
§ 371 (c)(1),
(2) Date: Dec. 5, 2017

(87) PCT Pub. No.: WO2016/208448
PCT Pub. Date: Dec. 29, 2016

(65) Prior Publication Data
US 2018/0154849 A1 Jun. 7, 2018

(30) Foreign Application Priority Data
Jun. 24, 2015 (JP) .................................. 2015-126316

(51) Int. Cl.
*B60R 16/023* (2006.01)
*H02G 3/16* (2006.01)

(52) U.S. Cl.
CPC ........... *B60R 16/0238* (2013.01); *H02G 3/16* (2013.01)

(58) Field of Classification Search
CPC ............................. B60R 16/0238; H02G 3/16

USPC ........................................................ 439/76.2
See application file for complete search history.

(56) References Cited

U.S. PATENT DOCUMENTS

| 7,367,818 B2 * | 5/2008 | Sakamoto | H01R 12/725 439/607.01 |
| 8,207,454 B2 * | 6/2012 | Darr | H05K 7/026 174/520 |
| 8,587,931 B2 * | 11/2013 | Shiraiwa | H01R 9/2466 361/624 |

(Continued)

FOREIGN PATENT DOCUMENTS

| JP | 2008-117675 A | 5/2008 |
| JP | 2010-187458 A | 8/2010 |
| JP | 2014-165960 A | 9/2014 |

OTHER PUBLICATIONS

Search Report for PCT/JP2016/067576, dated Jul. 5, 2016.

*Primary Examiner* — Alexander Gilman
(74) *Attorney, Agent, or Firm* — Honigman LLP

(57) ABSTRACT

Provided is an electrical connection box including a new structure, according to which, even in the case of using a component holding case in which terminal holding portions and electrical component mounting portions are integrated, engagement between connection terminal portions and supporting pins in a lateral component connection portion can be checked easily, and improvements in the workability and reliability of assembly and an improvement in work efficiency due to a reduction in the number of components can be achieved simultaneously. Through windows are provided in an upper wall portion of a component holding case so as to penetrate through positions opposing supporting pins arranged inside in a vertical direction.

1 Claim, 6 Drawing Sheets

(56) References Cited

U.S. PATENT DOCUMENTS

| | | | |
|---|---|---|---|
| 9,865,949 B2* | 1/2018 | Kitagawa | H01R 12/724 |
| 2005/0118864 A1* | 6/2005 | Watanabe | H01R 12/585 |
| | | | 439/567 |
| 2008/0108230 A1* | 5/2008 | Kasai | H05K 3/306 |
| | | | 439/74 |
| 2010/0203746 A1* | 8/2010 | Kita | H01H 85/2035 |
| | | | 439/76.1 |

* cited by examiner

ELECTRICAL CONNECTION BOX

CROSS-REFERENCE TO RELATED APPLICATIONS

This application is the U.S. national stage of PCT/JP2016/067576 filed Jun. 13, 2016, which claims priority of Japanese Patent Application No. JP 2015-126316 filed Jun. 24, 2015.

TECHNICAL FIELD

The present invention relates to an electrical connection box that is formed due to a circuit board being contained in a case, and in particular relates to an electrical connection box to which an electrical component is connected from a lateral side of a case.

BACKGROUND

Conventionally, an electrical connection box has been known in which a circuit board such as a printed circuit board is contained in a case so as to enable a conductive member connected to the circuit board to be connected to an electrical component such as a fuse. In particular, in recent years, accompanying demand for better space efficiency and higher density in electrical connection boxes, an electrical connection box has been known which includes a lateral component connection portion having multiple electrical component mounting portions that open laterally on a side surface thereof. The technique disclosed in JP 2014-165960A (JP 2014-165960A) is an example thereof.

In order to provide this kind of lateral component connection portion on the circuit board, it is necessary to bend the end portions of the conductive members connected to the circuit board such as substrate terminals or busbars into L shapes to cause connection terminals provided on the end portions to protrude toward the side edge portion of the circuit board in a direction of being level with the circuit board, as shown in FIG. 3 of JP 2014-165960A. Then, a lateral component connection portion is formed by containing and disposing the multiple connection terminal portions from rearward in component mounting holes that are provided so as to penetrate in the horizontal direction through the lateral component connection portion, in a state in which the multiple connection terminal portions are disposed in alignment in the width direction and height direction of the lateral component connection portion. In short, with the electrical connection box disclosed in JP 2014-165960A, the rear portions of the component mounting holes of the lateral component connection portion are used as terminal holding portions, and the front portions of the component mounting holes are used as electrical component mounting portions. Accordingly, the connection terminals can be contained from behind the component mounting holes, the electrical components can be mounted from the front of the component mounting holes, and the terminal holding portions and the electrical component mounting portions are integrated, whereby a reduction of the number of components is achieved.

Incidentally, with respect to these electrical component mounting portions of the lateral component connection portion mounted on the circuit board, when an electrical component is attached to or removed from an electrical component mounting portion provided on the side of the electrical connection box, or in other words, on the front portion of a component mounting hole, and a tab terminal of the electrical component is attached to or removed from a connection terminal portion provided on a substrate terminal or a busbar arranged rearward of the component mounting hole, an insertion or removal force is applied to the connection terminal portion in the direction of being level with the circuit board. For this reason, as disclosed in JP 2014-165960A, the conventional lateral component connection portion is constituted by including an insulation plate including supporting pins that are placed on the circuit board and protrude perpendicularly to the circuit board, and a component holding case into which the support pins can be inserted, the component holding case being assembled on the insulation plate and including component holding holes that penetrate therethrough in the direction of being level with the circuit board. Also, a structure is employed in which multiple supporting pins that are provided so as to protrude on the insulation plate are engaged with recessed and protruding engagement portions that are provided on the connection terminal portions arranged inside of the component holding case, and the above-described insertion or removal force is supported by the support pins.

However, it is not easy to perform the task of engaging the supporting pins that protrude in the direction orthogonal to the circuit board with the engagement portions of the connection terminal portions that extend in the direction of being level with the circuit board, and depending on the dimensional intersection, inclination, and the like of the supporting pins, there is an inherent possibility that the engagement of the supporting pins with the engagement portions will be incomplete. Furthermore, due to the fact that a structure is used in which the component holding case of the lateral component connection portion is oriented so as to be open on the lateral surface of the electrical connection box and the terminal holding portions and the electrical component mounting portions are integrated, a structure is used in which the upper portion and lateral portion of the component holding case are covered by an upper wall and a lateral wall, as shown in FIG. 4 of JP 2014-165960A. For this reason, there is an inherent problem in that when assembling the component holding case from above on the insulation plate on which the supporting pins are provided, an assembly worker is blocked by the upper wall of the terminal holding case and has difficulty checking the state of engagement between the supporting pins and the engagement portions, and therefore cannot easily detect incomplete engagement between the supporting pins and the engagement portions.

The present invention has been made in light of circumstances such as those disclosed above, and the problem to be solved lies in providing an electrical connection box including a new structure, according to which it is possible to easily check the engagement between connection terminal portions and supporting pins in a lateral component connection portion, and to simultaneously achieve an improvement in the workability and the reliability of assembly and an improvement in work efficiency due to a reduction in the number of components, even in the case of using a component holding case in which the terminal holding portions and the electrical component mounting portions are integrated.

SUMMARY

A first aspect of the present invention is an electrical connection box including: a case; a circuit board contained in the case; and a lateral component connection portion that is provided on the circuit board and enables connection of an electrical component from a lateral direction of the circuit board, wherein the lateral component connection portion includes an insulation plate that is placed on the circuit board and includes a plurality of support pins that protrude in a vertical direction perpendicular to the circuit board, and a component holding case that is assembled on the insulation plate by the supporting pins being inserted therein, includes a plurality of component mounting holes that penetrate in the lateral direction, and integrally includes terminal holding portions provided on rearward sides of the component mounting and electrical component portions provided on frontward sides of the component mounting holes, the electrical connection box further comprises connection terminal portions that are arranged in alignment in a width direction and a height direction of the lateral component connection portion and enable connection with the electrical components inserted into the electrical component mounting portions due to being electrically connected to the circuit board and being held in inner portions of the terminal holding portions, an insertion or removal force applied when inserting or removing the electrical components to or from the connection terminal portions is supported by the supporting pins due to the supporting pins engaging with engagement portions provided on the connection terminal portions, and through windows are provided on an upper wall portion of the component holding case so as to penetrate through positions opposing the supporting pins arranged inside in the vertical direction, leading end portions of the supporting pins are disposed at positions that are above the connection terminal portion arranged the closest to the upper wall portion in the lateral component connection portion and do not protrude from the through window, and the upper wall portion of the component holding case is provided with a cut-out portion rearward of the through windows, and a base end portion of the connection terminal portion arranged the closest to the upper wall portion in the lateral component connection portion is exposed via the cut-out portion.

According to the present aspect, a plurality of component mounting holes that penetrate in a horizontal direction that is level with the circuit board, or in other words, in a lateral direction, are provided in the component holding case of the lateral component connection portion, the electrical component mounting portions are provided on the front sides of the component mounting holes, and the terminal holding portions are provided on the rear sides of the component mounting holes. Accordingly, due to the fact that a component holding case can be used in which the terminal holding portions and the electrical component mounting portions are integrated, it is possible to achieve an optimization of the assembly workability due to a reduction in the number of components and a reduction in the number of assembly steps.

Also, even in the case of using this kind of component holding case, through windows are provided on the upper wall portion of the component holding case so as to penetrate through the positions opposing the supporting pins arranged in the inner portion in the vertical direction. Accordingly, when the component holding case is assembled from above the insulation plate, it is possible to easily check the positions of the supporting pins through the through windows arranged so as to penetrate through the upper wall portion of the component holding case. Accordingly, it is possible to easily perform the task of engaging the supporting pins with the engagement portions of the connection terminal portions provided at corresponding positions in the direction orthogonal to the circuit board, and it is possible to reliably execute checking of the state of engagement between the supporting pins and the engagement portions through visual or mechanical examination. For this reason, it is possible to achieve improvements in the workability and the reliability of assembling the supporting pins on the engagement portions of the connection terminal portions at the same time as achieving optimization of assembly workability based on a reduction in the number of components due to employing the component holding case.

Note that examples of the conductive members including the connection terminal portions include substrate terminals with end portions on one side soldered to the circuit board and end portions that are bent in L shapes and protrude in the horizontal direction used as the connection terminal portions, and busbars with flat metal parts arranged on the circuit board and end portions that are bent in L shapes and protrude in the horizontal direction used as the connection terminal portions.

According to the present aspect, at the regular arrangement positions of the supporting pins, the leading end portions of the supporting pins are arranged at positions above the connection terminal portions that are at the highest position, or in other words, located the closest to the upper wall portion, and do not protrude from the through windows, and thus a case in which the supporting pins are not in the regular assembled state can be more easily checked from the outside. Accordingly, it is possible to more easily and reliably determine an irregular state of engagement between the supporting pins and the engagement portions of the connection terminal portions. Moreover, due to the fact that the leading ends of the supporting pins are prevented from protruding through the through windows, when the circuit board on which the lateral component mounting portion is mounted is assembled on the case, an inconvenience such as the supporting pins interfering with the case or the like is prevented.

According to the present aspect, due to the fact that the base end portions of the connection terminal portions arranged at the uppermost position, or in other words, the position closest to the upper wall portion, are exposed via a cut-out portion provided rearward of the through windows of the upper wall portion of the component holding case, the type of the circuit board can be easily checked through visual or mechanical examination or the like if a circuit configuration that is branched from the connection terminal portions contained and disposed in the lateral component connection portion differs according to vehicle type or the like. Accordingly, even if a reduction in the number of components is achieved using a component holding case in which the terminal holding portions and the electrical component mounting portions are integrated, the type of the circuit board can be easily checked with a simple structure in which the cut-out portion is merely provided on the upper wall portion of the component holding case, and it is possible to simultaneously achieve further improvements in the work efficiency and work reliability.

Advantageous Effects of Invention

According to the present invention, due to the fact that it is possible to use a component holding case in which the terminal holding portions and the electrical component mounting portions are integrated, it is possible to achieve optimization of the assembly workability due to a reduction in the number of components and a reduction in the number of assembly steps. Even if this kind of component holding case is used, due to the fact that the through windows are provided so as to penetrate through positions opposing the supporting pins in the upper wall portion of the component holding case, the positions of the supporting pins can be easily checked through the through windows when the component holding case is assembled from above the insulation plate. Accordingly, the task of engaging the supporting pins with the engagement portions of the connection terminal portions can be performed easily, and the engagement state between the supporting pins and the engagement portions can be checked reliably through visual or mechanical examination. For this reason, even if a component holding case is used, it is possible to achieve improvements in the workability and the reliability of assembling the supporting pins on the engagement portions of the connection terminal portions.

DETAILED DESCRIPTION OF PREFERRED EMBODIMENTS

Hereinafter, an embodiment of the present invention will be described with reference to the drawings.

Figure 1:
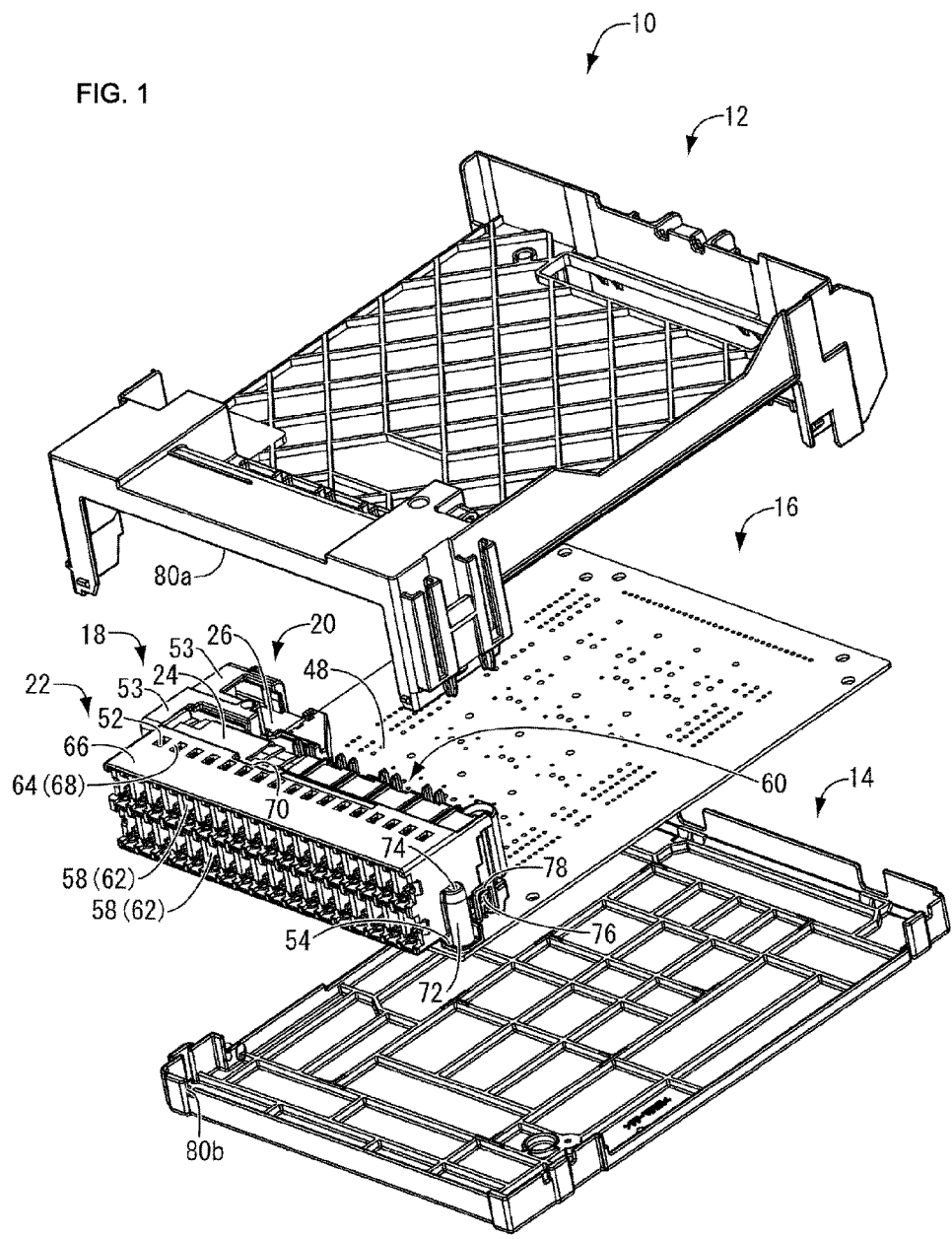
FIG. 1 is an exploded perspective view of an electrical connection box serving as an embodiment of the present invention.

FIGS. 1 to 6 show an electrical connection box 10 serving as an embodiment of the present invention. As shown in FIG. 1, the electrical connection box 10 has a configuration in which a printed circuit board 16 constituting a circuit board is contained between an upper case 12 and a lower case 14, which are cases formed through extrusion molding or the like using a synthetic resin such as polypropylene (PP) or polyamide (PA), for example. Note that in the following description, unless stated otherwise, the upper side is the upper case 12 side, the lower side is the lower case 14 side, the front side is the left side in FIG. 2, and the rear side is the right side in FIG. 2.

Figure 2:
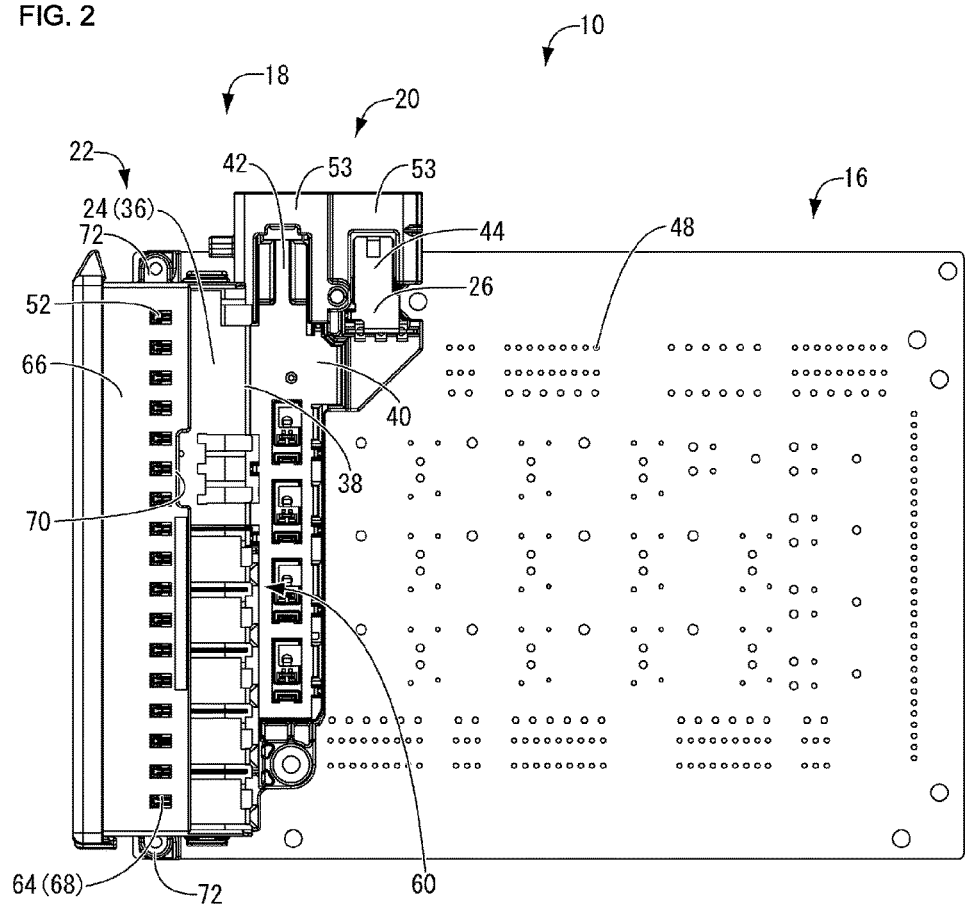
FIG. 2 is a plan view of a printed circuit board shown in FIG. 1.

As shown in FIGS. 1 and 2, a fuse module 18 serving as a lateral component connection portion, which enables connection of fuses serving as electrical components (not shown) from a lateral direction to the printed circuit board 16, is mounted by being placed on one end portion of the printed circuit board 16. Note that as is conventionally known, various electrical components, such as relays and connectors (not shown), are mounted on the printed circuit board 16 along with the fuse module 18. Also, as shown in FIGS. 3 to 6, the fuse module 18 includes an insulation plate 20 placed on the printed circuit board 16 and a component holding case 22 assembled on the insulation plate 20. Furthermore, the fuse module 18 is constituted by including multiple busbars 24 and 26 that are placed on and supported by the upper surface of the insulation plate 20, and multiple substrate terminals 28a to 28c. The busbars 24 and 26 and the substrate terminals 28a to 28c are all conductive members with end portions on one side connected to the printed circuit board 16 through soldering.

Figure 4:
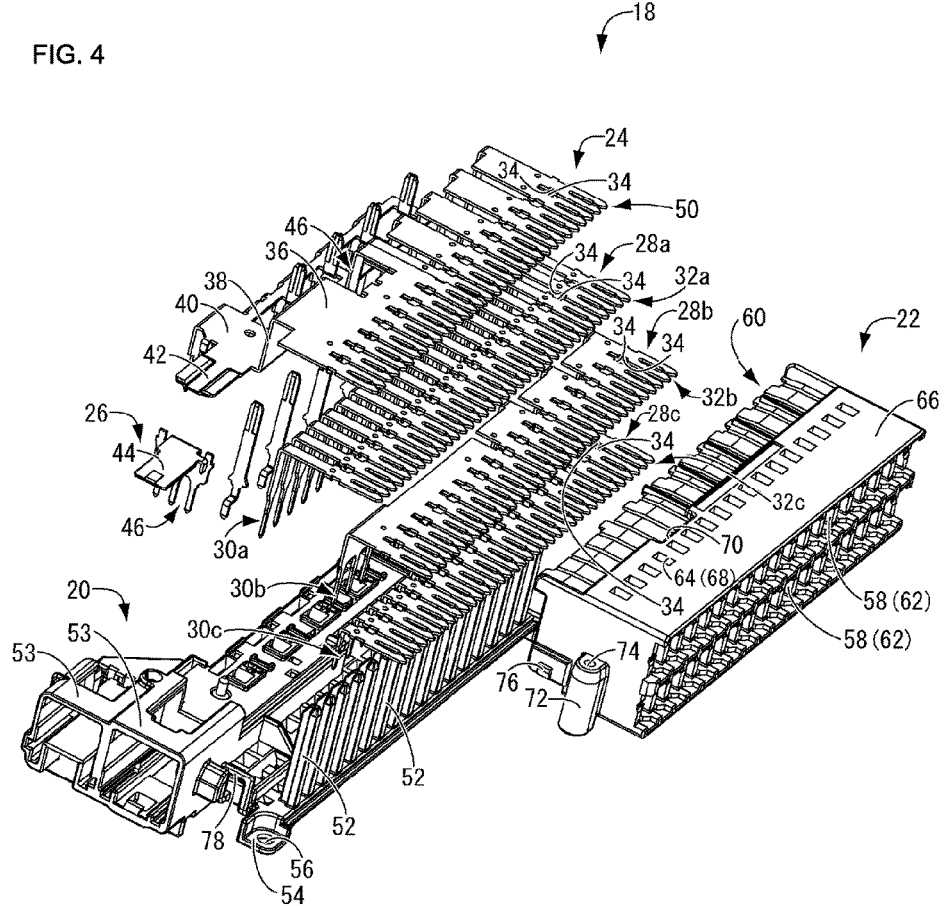
FIG. 4 is an exploded perspective view of FIG. 3.

More specifically, as shown in FIG. 4, the substrate terminals 28a to 28c are punched out from a metal plate made of copper, a copper alloy, or the like, for example, are given approximate L shapes that are bent at right angles, and soldered portions 30a to 30c that are soldered to the printed circuit board 16 are provided on the end portions on one side of the substrate terminals 28a to 28c. The sizes of the substrate terminals 28a to 28c are different from each other, and the protrusion heights thereof from the printed circuit board 16 when provided in a standing manner on the printed circuit board 16 are different from each other. Also, connection terminal portions 32a to 32c that have a tuning fork shape are provided on the other end portions of the substrate terminals 28a to 28c. In other words, the connection terminal portions 32a to 32c have known tuning fork shapes that include a pair of press contact blades, and tab terminals of fuses (not shown) are press fitted between the press contact blades. Furthermore, a pair of engagement portions 34 and 34 that are approximately rectangular and recessed and open toward the outside in the width direction are provided on both sides in the width direction of the base end portions of the connection terminal portions 32a to 32c that are tuning fork shaped, and later-described support pins 52 are engaged with the engagement portions 34.

Figure 5:
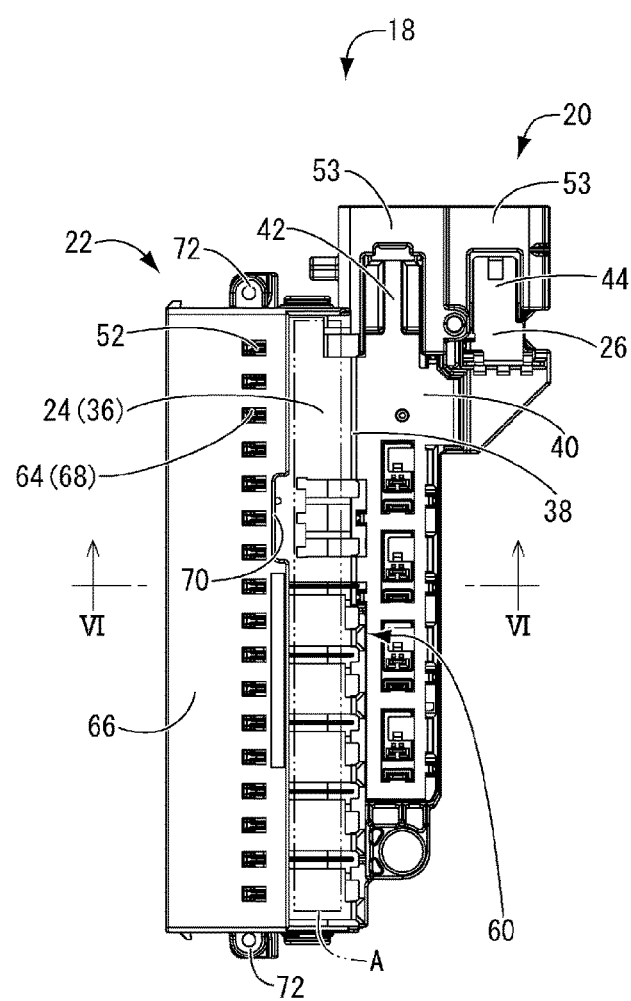
FIG. 5 is a plan view of FIG. 3.

On the other hand, the busbars 24 and 26 placed on the insulation plate 20 are formed using metal plates made of copper, a copper alloy, or the like, which have been punched out through press machining. As shown in FIG. 4, the busbar 24 has a crank shape and includes an upper wall portion 36 with an approximately flat shape, a rear wall portion 38 that is bent perpendicularly from the upper wall portion 36 and extends downward perpendicularly to the upper wall portion 36, and a flat portion 40 that is bent perpendicularly from the lower end of the rear wall portion 38 and extends perpendicularly to the rear wall portion 38. Also, as shown in FIGS. 4 and 5, a tab terminal 42 is provided so as to protrude at the side edge portion of the flat portion 40 of the busbar 24. Note that the busbar 26 has an approximately rectangular plate shape that extends in the horizontal direction, and a tab terminal 44 is provided so as to protrude at the side edge portion of the busbar 26. Also, the tab terminals 42 and 44 are contained and disposed in a connector housing 53 of the later-described insulation plate 20.

Furthermore, multiple soldered portions 46 that protrude toward the printed circuit board 16 are formed integrally on the extended end portion on the flat portion 40 side of the busbar 24 and the side edge portion on the side on which the tab terminal 44 of the busbar 26 is not provided, and the multiple soldered portions 46 are inserted into through holes 48 provided through the printed circuit board 16 and are fixed by soldering.

As shown in FIG. 4, a connection terminal portion 50 which has multiple tuning fork shapes is provided integrally on the extended end portion on the upper wall portion 36 side of the busbar 24. The connection terminal portion 50 has a known tuning fork shape composed of pairs of press contact blades located apart from each other, and can connect to fuses due to the tab terminals of the fuses (not shown) being pressed into the gaps between the press contact blades.

The busbars 24 and 26 with this kind of structure are supported by being placed on the insulation plate 20 placed on the printed circuit board 16. As shown in FIG. 4, the insulation plate 20 has an approximately rectangular flat shape overall, and is an integrally-molded product formed of a non-conductive synthetic resin such as PBT containing highly heat-resistant glass fiber, so as to ensure heat resistivity for when soldering the busbars 24 and 26 and the substrate terminals 28a to 28c to the printed circuit board 16. Also, the multiple supporting pins 52 are located on the front end side (the lower right side in FIG. 4) of the insulation plate 20 and are formed in parallel in a straight line. The support pins 52 each have a rod shape that protrudes upward (in the direction perpendicular to the printed circuit board 16) from the insulation plate 20 and has a cross section that is approximately upside-down T-shaped. Furthermore, two approximately square tube-shaped connector housings 53 that open outward in the lengthwise direction of the insulation plate 20 are formed on one end portion side (the lower left side in FIG. 4) in the lengthwise direction of the insulation plate 20. In addition, as shown in FIGS. 4 and 5, leg portions 54 that are recessed portions with a quarter-circle shape extending in an approximately 90-degree range are formed on both end portions in the width direction on the front end side (the lower right side in FIG. 4) of the insulation plate 20, and screw through holes 56 are provided through the central portions of the leg portions 54.

On the other hand, the component holding case 22 is formed of a non-conductive synthetic resin such as general-use engineering plastic such as PBT or PA, which has a lower heat resistance than the insulation plate 20, and as shown in FIGS. 4 and 5, the component holding case 22 has a lengthwise block shape that has a width direction dimension approximately equal to that of the insulation plate 20.

The component holding case 22 is provided with multiple component mounting holes 58 that extend in the depth direction (left-right direction in FIG. 5) of the component holding case 22, through the component holding case 22 in the horizontal direction that is level with the surface of the printed circuit board 16, or in other words, the lateral direction. The multiple component mounting holes 58 are formed by being arranged in alignment in a straight line in the width direction of the component holding case 22 and divided into upper and lower levels in the height direction of the component holding case 22 (see FIGS. 1 and 4). Also, the connection terminal portions 32a to 32c of the substrate terminals 28a to 28c and the connection terminal portion 50 of the busbar 24, which protrude in the horizontal direction, are arranged in alignment in the width direction and the height direction of the fuse module 18. Due to the connection terminal portions 32a to 32c and 50 being contained and disposed in the terminal holding portions 60 provided on the lateral side of the component mounting holes 58 and fuse (not shown) being mounted on the fuse mounting portions 62, which is an electrical component mounting portion provided on the front side of the component mounting hole 58, the tab terminals of the fuses can be connected to the connection terminal portions 32a to 32c and 50.

Figure 6:
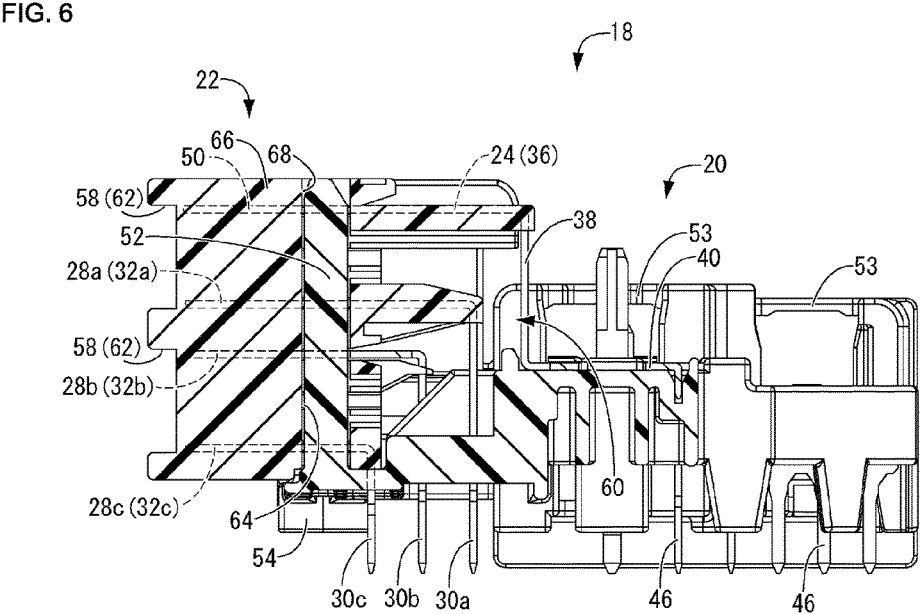
FIG. 6 is an enlarged view of a cross section taken along line VI-VI in FIG. 5.

Also, in the approximate central portion in the depth direction (the left-right direction in FIG. 5) of the component holding case 22, multiple pin insertion holes 64 that are provided through the printed circuit board 16 in the vertical direction (the up-down direction in FIG. 4) that is orthogonal to the surface, and in which the supporting pins 52 are contained and disposed, are arranged in alignment in a straight line in the width direction of the component holding case 22. Accordingly, on the upper wall portion 66 of the component holding case 22, the through windows 68 are provided so as to penetrate through positions opposing the support pins 52 arranged in the supporting pin through holes 64 in the vertical direction. More specifically, as shown in FIG. 6, at the regular arrangement positions of the leading ends of the supporting pins 52, the leading end portions of the supporting pins 52 are arranged at positions that are above the connection terminal portion 50 of the busbar 24 arranged at the uppermost position, in other words, the closest to the upper wall portion 66 in the height direction (the upper direction in FIG. 6) of the fuse module 18, and do not protrude from the through window 68.

Furthermore, as shown in FIG. 5, in the upper wall portion 66 of the component holding case 22, an approximately rectangular cut-out portion 70 that is open to the rear is formed rearward of the through windows 68, and the upper wall portion 36, which is the base end portion of the connection terminal portion 50 of the busbar 24 arranged at the uppermost position, or in other words, the closest to the upper wall portion 66 in the height direction of the fuse module 18, is exposed via the cut-out portion 70.

In addition, as shown in FIGS. 1 to 4, on both end portions in the width direction of the component holding case 22, engaging protrusions 72, which protrude toward the printed circuit board 16, are formed integrally. The engaging protrusions 72 have a cylindrical shape and are internally provided with screw holes 74 that open on the bottom surface side (the printed substrate 16 side).

In the case of assembling the fuse module 18 with the above-described structure, first, as shown in FIG. 4, the connection terminal portion 50 of the busbar 24 and the connection terminal portions 32a to 32c of the substrate terminals 28a to 28c are inserted into predetermined component holding holes 58 from the rearward side (in FIG. 4, the left side) of the component holding case 22. Note that with the component holding case 22 shown in FIGS. 1 and 3, the connection terminal portion 50 of the predetermined busbar 24 and the connection terminal portions 32a to 32c of the substrate terminals 28a to 28c are arranged in the terminal holding portions 60 provided on the rearward sides of the component mounting holes 58, and the press contact blades of the connection terminal portions 32a to 32c and 50 are oriented facing from the fuse mounting portions 62 provided on the front sides of the component mounting holes 58.

Next, the component holding case 22 in which the busbar 24 and the substrate terminals 28a to 28c are contained and disposed is overlaid on the insulation plate 20 from above. At this time, the component holding case 22 can be positioned and assembled on the insulation plate 20 by inserting the multiple support pins 52 provided so as to protrude on the insulation plate 20 into the multiple supporting pin insertion holes 64 provided at corresponding positions on the component holding case 22. Note that the supporting pins 52 can support the insertion or removal force at the time of inserting or removing the tab terminals of the fuse (not shown) into or from the gaps between the press contact blades of the connection terminal portions 32a to 32c and 50 by being fit into the engagement portions 34 provided by cutting out the side edge portions of the base end portions of the connection terminal portions 32a to 32c and 50 of the busbar 24 and the substrate terminals 28a to 28c into recessed shapes.

Also, when the component holding case 22 is overlaid on the insulation plate 20, the soldered portions 46 provided on the busbar 24 and the soldered portions 30a to 30c provided on the substrate terminals 28a to 28c are inserted into through holes (not shown) provided in the insulation plate 20 and protrude below the insulation plate 20. Furthermore, the tab terminals 42 and 44 provided on the busbars 24 and 26 are contained and disposed in the connector housing 53 of the insulation plate 20 and the partner-side connector (not shown) is mounted on the connector housing 53, whereby a power source and a signal are input from an external device to the busbars 24 and 26 via the tab terminals 42 and 44.

Figure 3:
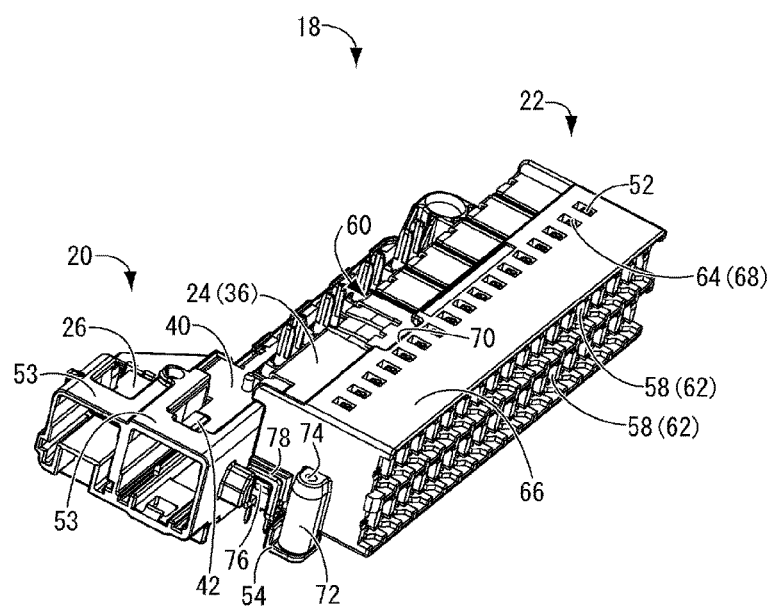
FIG. 3 is a perspective view from the left side of a fuse module shown in FIG. 1.

In addition, when the component holding case 22 is overlaid on the insulation plate 20, the engaging protrusions 72 of the component holding case 22 are placed on the screw through holes 56 formed in the leg portion 54 of the insulation plate 20, and the screw holes 74 provided in the engaging protrusions 72 are positioned approximately coaxially with the screw through holes 56 provided in the insulation plate 20. Also, as shown in FIGS. 3 to 4, on both side surfaces in the lengthwise direction of the component holding case 22, locking claws 76 are provided so as to protrude near the engaging protrusions 72, and engaging frame bodies 78 provided so as to protrude in a cantilever form are fit near the leg portions 54 of the insulation plate 20 so as to lock with the locking claws 76, whereby the insulation plate 20 is fit by locking with the component holding case 22 in a positioned state.

The fuse module 18 formed in this manner is placed on one of the side end portions of the printed circuit board 16. When the fuse module 18 is to be placed on the printed circuit board 16, the soldered portions 46 of the busbar 24 and soldered portions 30a to 30c of the substrate terminals 28a to 28c, which protrude from the insulation plate 20, are inserted into the through holes 48 provided through the printed circuit board 16. In addition, the screw holes 74 provided in the engaging protrusions 72 of the component holding case 22, and the screw through holes 56 formed in the leg portions 54 of the insulation plate 20, which are approximately coaxially aligned with each other, are overlaid on each other by being positioned over through holes (not shown) provided in the printed circuit board 16. Then, by inserting fixing bolts (not shown) into the through holes and the screw through holes 56 and screwing them into the screw holes 74 of the engaging protrusions 72 from the rear surface side of the printed circuit board 16, the engaging protrusions 72 are fixed to the printed circuit board 16 via the insulation plate 20. Accordingly, the component holding case 22 is strongly fixed to the printed circuit board 16, and the insulation plate 20 is fixed by being sandwiched between the engaging protrusions 72 and the printed circuit board 16 of the component holding case 22.

In this way, after the fuse module 18 is fixed on the printed circuit board 16, the soldered portions 46 of the busbar 24 and the soldered portions 30a to 30c of the substrate terminals 28a to 28c, which are inserted into the through holes 48 in the printed substrate 16, and the lead portions or the like of the electrical components such as the relays (not shown), which are mounted on the same surface as the fuse module 18 on the printed circuit board 16, are soldered to the printed circuit board 16 using a known procedure, such as flow soldering, for example. As a result, the fuse module 18 is fixed in a state of being arranged beside the printed substrate 16, and the busbars 24 and 26, the substrate terminals 28a to 28c, and the like are electrically connected to printed wires (not shown) provided on the printed circuit board 16.

Finally, the printed circuit board 16 with this kind of structure is contained between the upper case 12 and the lower case 14, and the upper case 12 and the lower case 14 are mutually assembled, whereby the electrical connection box 10 is completed. That is, due to the fuse module 18 being contained and disposed between the side surface opening portions 80a and 80b of the cases 12 and 14, the fuse module 18, which is a lateral component connection portion is arranged in a state of being open to the sides of the cases 12 and 14 (see FIG. 1). Also, due to the fuses (not shown) serving as the electrical components being mounted by being pressed from the side of the printed circuit 16 into the fuse mounting portions 62, the tab terminals of the fuses inserted into the fuse mounting portions 62 are connected by being press-fitted between the press contact blades of the connection terminal portion 50 of the busbar 24 and the connection terminal portions 32a to 32c of the substrate terminals 28a to 28c arranged in the component mounting holes 58.

According to the electrical connection box 10 in the present embodiment, multiple component mounting holes 58 that penetrate through the component holding case 22 in the horizontal direction, or in other words, in a lateral direction, which is level with the surface of the printed circuit board 16, are formed in the component holding case 22, and the terminal holding portions 60 are provided on the rearward sides of the component mounting holes 58, whereas the fuse mounting portions 62, which are electrical component mounting portions, are provided on the front sides of the component mounting holes 58. Accordingly, due to the fact that the terminal holding portions 60 and the fuse mounting portions 62 can be integrated in the component holding case 22, it is possible to achieve optimization of the assembly workability due to a reduction in the number of components and a reduction in the number of assembly steps. Moreover, even if this kind of component holding case 22 is used, due to the fact that the through windows 68 are provided through the upper wall portion 66 of the component holding case 22 at positions opposing the supporting pins 52 arranged in the supporting pin insertion holes 64 in the vertical direction, the positions of the supporting pins 52 can be easily checked through the through windows 68 when the component holding case 22 is assembled from above the insulation plate 20. Accordingly, the task of engaging the supporting pins 52 with the engagement portions 34 of the desired connection terminal portions 32a to 32c and 50 can be performed easily, and checking of the state of engagement between the supporting pins 52 and the engagement portions 34 can be executed reliably through visual or mechanical examination. For this reason, improvements in the workability and reliability of assembling the desired connection terminal portions 32a to 32c and 50 of the support pins 52 on the engagement portions 34 can be achieved while using the component holding case 22, in which the terminal holding portions 60 and the fuse mounting portions 62 are integrated.

Also, at the regular arrangement positions of the supporting pins 52, the leading end portions of the supporting pins 52 are set above the connection terminal portion 50 of the busbar 24 arranged at the uppermost position, or in other words, the closest to the upper wall portion 66 in the height direction of the fuse module 18, and because of this, it is possible to more easily check whether or not the regular assembly state of the supporting pins 52 can be achieved. Moreover, at the regular arrangement positions of the supporting pins 52, the leading end portions of the supporting pins 52 are arranged at positions that do not protrude from the through window 68, and due to this fact, it is possible to prevent an inconvenience such as the supporting pins 52 interfering with the cases 12 and 14 or the like when the printed circuit board 16 on which the fuse module 18 serving as the lateral component connection portion is mounted in the cases 12 and 14.

In addition, the base end portion A (see FIG. 5) of the connection terminal portion 50 of the busbar 24 arranged at the uppermost position, or in other words, the closest to the upper wall portion 66, is exposed via the cut-out portion 70 provided rearward of the through window 68 of the upper wall portion 36 of the component holding case 22. Accordingly, if the circuit configuration of the busbar 24 contained and disposed in the fuse module 18 differs depending on the vehicle type or the like, the difference in the circuit configuration depending on the vehicle type or the like can be easily checked by checking the shape of the base end portion A. For this reason, even if the terminal holding portions 60 and the fuse mounting portions 62 are integrated in the component holding case 22, the type of circuit configuration depending on the vehicle type or the like can be easily checked with a simple configuration in which the cut-out portion 70 is merely provided on the upper wall portion 36 of the component holding case 22, and it is possible to simultaneously achieve further improvements in work efficiency and work reliability.

Although an embodiment of the present invention has been described in detail above, the present invention is not limited by this specific description. For example, although a fuse module 18 to which fuses are connected was described as an example as the lateral component connection portion, another electrical component such as a relay or a connector may be connected to the lateral component connection portion. In this case, the shapes of the connection terminal portions 32a to 32c and 50 provided on the busbar 24 and the substrate terminals 28a to 28c may have a tab shape other than the tuning fork shape. Note that the shapes, numbers, arrangement layout, and the like of the busbar 24 and the substrate terminals 28a to 28c are changed arbitrarily according to the required circuit configuration.

The invention claimed is:

1. An electrical connection box comprising:
   a case;
   a circuit board contained in the case; and
   a lateral component connection portion that is provided on the circuit board and enables connection of an electrical component from a lateral direction of the circuit board,
   wherein the lateral component connection portion includes an insulation plate that is placed on the circuit board and includes a plurality of support pins that protrude in a vertical direction perpendicular to the circuit board, and a component holding case that is assembled on the insulation plate by the supporting pins being inserted therein, includes a plurality of component mounting holes that penetrate in the lateral direction, and integrally includes terminal holding portions provided on rearward sides of the component mounting holes and electrical component mounting portions provided on frontward sides of the component mounting holes,
   the electrical connection box further comprises connection terminal portions that are arranged in alignment in a width direction and a height direction of the lateral component connection portion and enable connection with the electrical components inserted into the electrical component mounting portions due to being electrically connected to the circuit board and being held in inner portions of the terminal holding portions,
   an insertion or removal force applied when inserting or removing the electrical components to or from the connection terminal portions is supported by the supporting pins due to the supporting pins engaging with engagement portions provided on the connection terminal portions,
   through windows are provided on an upper wall portion of the component holding case so as to penetrate through positions opposing the supporting pins arranged inside in the vertical direction,
   leading end portions of the supporting pins are disposed at positions that are above the connection terminal portion arranged the closest to the upper wall portion in the lateral component connection portion and do not protrude from the through window, and
   the upper wall portion of the component holding case further including a back edge opposite a front face of the component holding case, the back edge extending along an axis, a cut-out portion formed on the back edge and rearward of the through windows, the cut-out portion being recessed in a lateral direction the cut-out portion visibly exposing a base end portion of the connection terminal portion arranged the closest to the upper wall portion in the lateral component connection portion.

* * * * *